DESKEWING OF DATA READ FROM AN INCREMENTALLY DRIVEN TAPE

Filed Jan. 13, 1967 7 Sheets-Sheet 1

INVENTORS
EARL G. McDONALD, JR.
WALTER R. HAHS

BY Hughes, Rothwell, Mion, Zinn & Macpeak

ATTORNEYS

DESKEWING OF DATA READ FROM AN INCREMENTALLY DRIVEN TAPE

Filed Jan. 13, 1967 7 Sheets-Sheet 4

DESKEWING OF DATA READ FROM AN INCREMENTALLY DRIVEN TAPE

United States Patent Office 3,544,979
Patented Dec. 1, 1970

3,544,979

DESKEWING OF DATA READ FROM AN INCREMENTALLY DRIVEN TAPE

Earl G. McDonald, Jr., Shelburne, Vt., and Walter R. Hahs, Rockledge, Fla., assignors to International Business Machines Corporation, Armonk, N.Y., a corporation of New York Filed Jan. 13, 1967, Ser. No. 609,205
Int. Cl. G11b *15/02, 15/12, 15/20*
U.S. Cl. 340—174.1 7 Claims

ABSTRACT OF THE DISCLOSURE

A system for deskewing the bits of a character recorded in parallel tracks on a magnetic tape which is driven past a read head in steps. The character detection circuits are squelched until the tape speed is great enough to produce a useful read signal and the first bit in a character has been sensed. A logic circuit relates tape velocity to the distance traveled by the tape during each step such that the squelch is removed and character bits are read during a fixed reading cycle which may span two steps. When the first bit of a character is sensed after minimum tape speed is attained, the output of a clock multivibrator is gated on to initiate the reading cycle. The bits from the plural channels are transferred to corresponding channel skew registers which are readout at the end of the reading cycle which is terminated when a predetermined number of multivibrator clock pulses are counted. The tape is normally stepped once during each bit period. However, if the first bit of a character is sensed late in a step, two steps will be required to sense the complete character. In this case, another partial or complete character may be sensed and stored in the skew registers. In the case of a complete character being stored, the character is available without stepping the tape again. When the first bit is sensed at a point in the tape step such that the reading cycle occurs during the higher velocity portion of the step, readout is squelched before said predetermined number of pulses is counted.

This invention relates generally to deskewing of data bits recorded in parallel tracks on a magnetic tape and more particularly to the deskewing of said data bits when the tape is driven incrementally or in steps rather than continuously past a read head.

BACKGROUND OF THE INVENTION

Two problems which must be solved in deskewing of incrementally driven tapes are varying speed of the tape and creep, i.e. different distance traveled by the tape during steps. In this invention, the varying speed problem is solved by squelching the readout of the tape data until the tape has reached sufficient speed to produce a useable signal and reading data only while the tape maintains the minimum speed. Creep refers to the fact that the exact distance the tape travels during each step is very difficult to control because of mechanical inertia, stretching of the tape, etc. Sometimes a step may be not be long enough to sense all bits of a character, and other times the step is long enough to collect one character plus some bits of the following character. The creep problem is solved in this invention by automatically initiating a second step if all the bits of a first character have not been read and also providing for the storage of the bits of a second character which may be read during the second step.

SUMMARY OF THE INVENTION

The invention may be briefly and broadly summarized as a deskewing system for the bits of a character read from an incrementally driven plural channel tape. The reading circuits are squelched until the tape has attained the minimum velocity necessary to produce an intelligible signal. When the first bit of a character is sensed, a logic circuit initiates a character gate of predetermined duration during which the skewed bits of the character are read into individual skew registers. When all the bits are gated or when the tape velocity falls below a minimum value, the reading circuits are again squelched. When two steps are required to sense all the bits of one character, a second character may be sensed during the second step. The system has the capability of storing the second character so that it is available on demand without stepping the tape again. In one modification of the invention, if the first bit is sensed during the higher velocity portion of a step, a shorter character gate is produced by the logic circuit. In another embodiment of the invention, the tape is stepped twice during each charatcer period.

The foregoing and other objects, features and advantages of the invention will be apparent from the following more particular description of preferred embodiments of the invention, as illustrated in the accompanying drawings.

Figure 3:
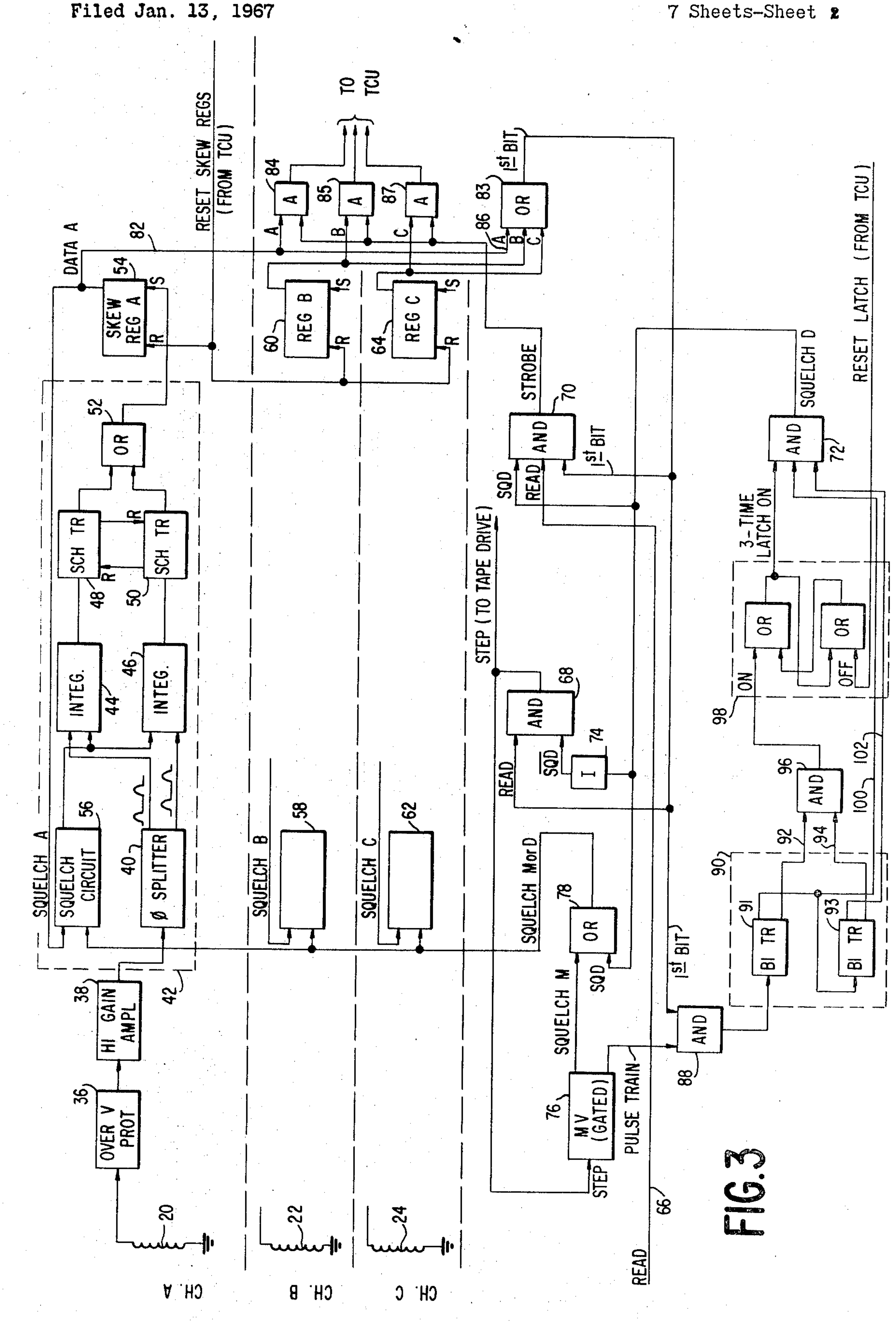
FIG. 3 is a logic block diagram of a preferred embodiment of the deskewing system of the invention.
Figure 8:
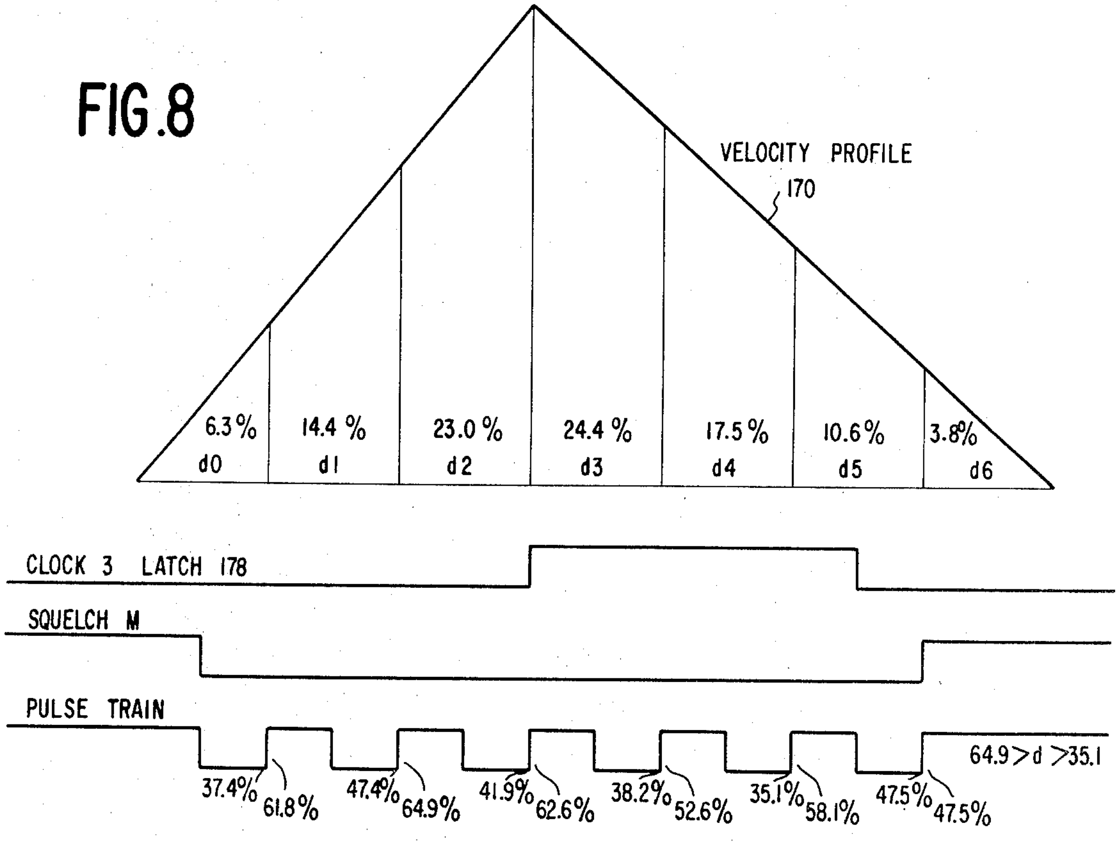
Figure 9:
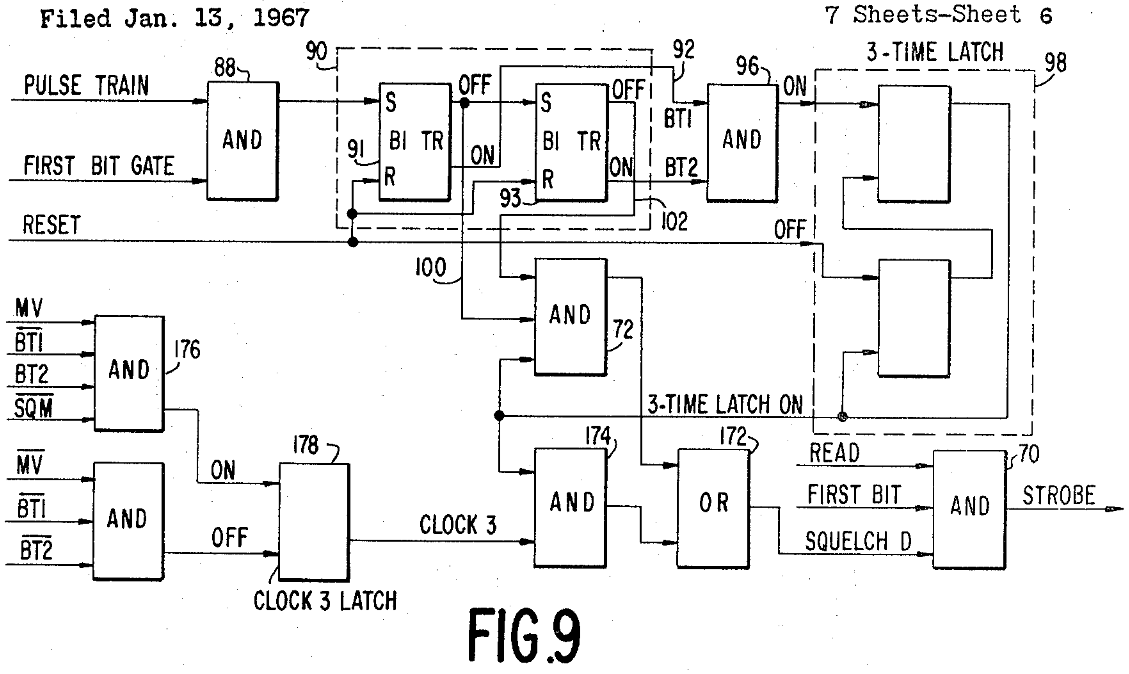
Figure 12:
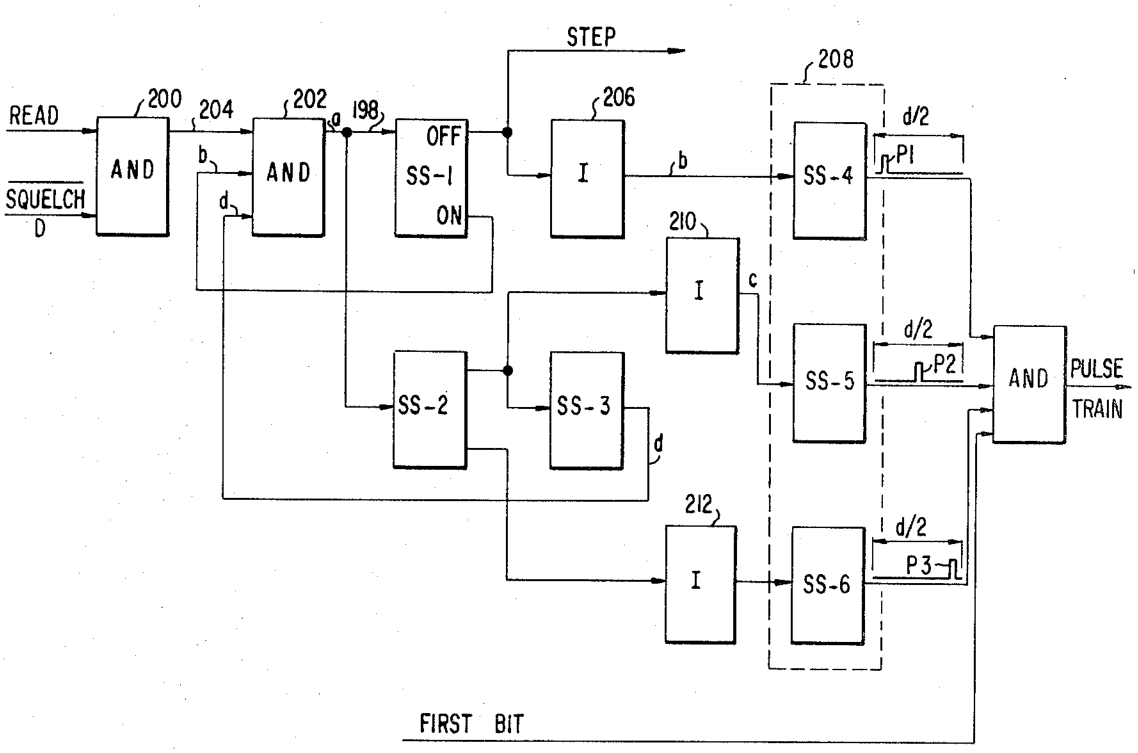
Figure 10:
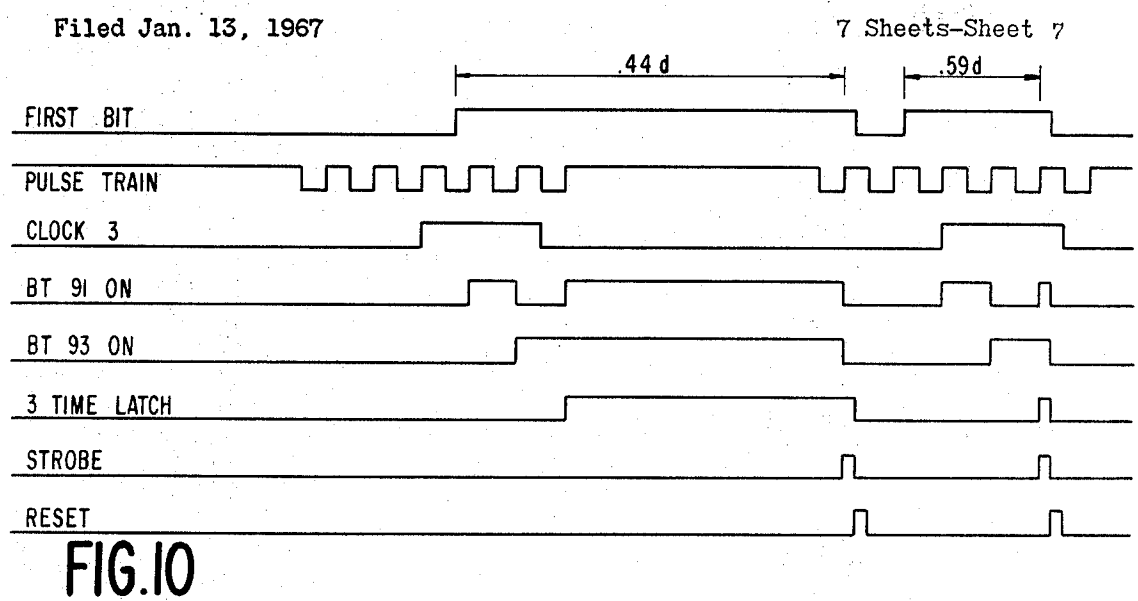
Figure 11:
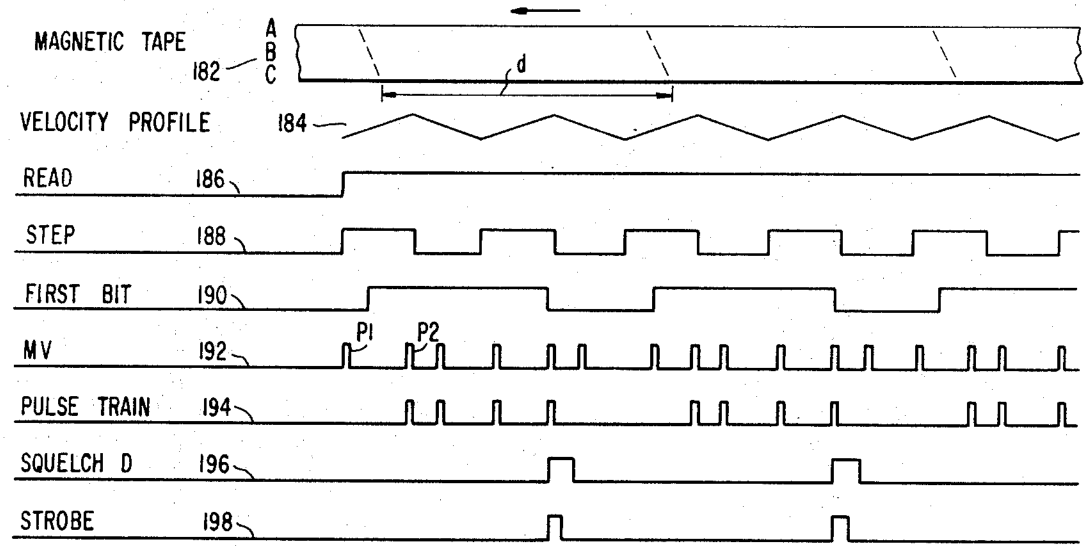
Figure 13:
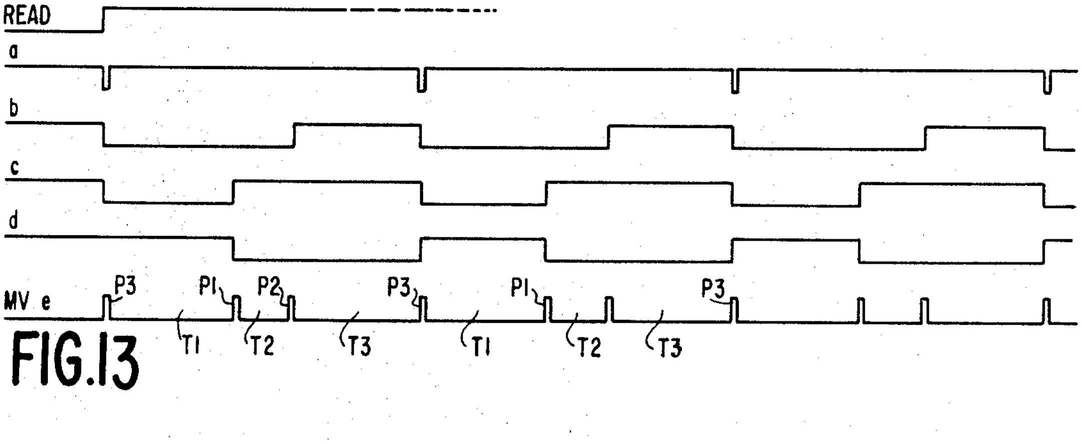

FIG. 8 relates to the velocity profile of a stepped tape to the reading cycle of the deskewing system;

FIG. 9 is a logic block diagram of a modification of a portion of FIG. 3;

FIG. 10 is a timing chart illustrating timing pulses generated in the logic circuit of FIG. 9;

FIG. 11 is a timing chart illustrating the timing pulses used in a second embodiment of the deskewing system;

FIG. 12 is a logic diagram of a portion of the deskewing system of the second embodiment; and FIG. 13 is a timing chart illustrating the timing pulses generated in the logic circuit of FIG. 12.

Figure 1:
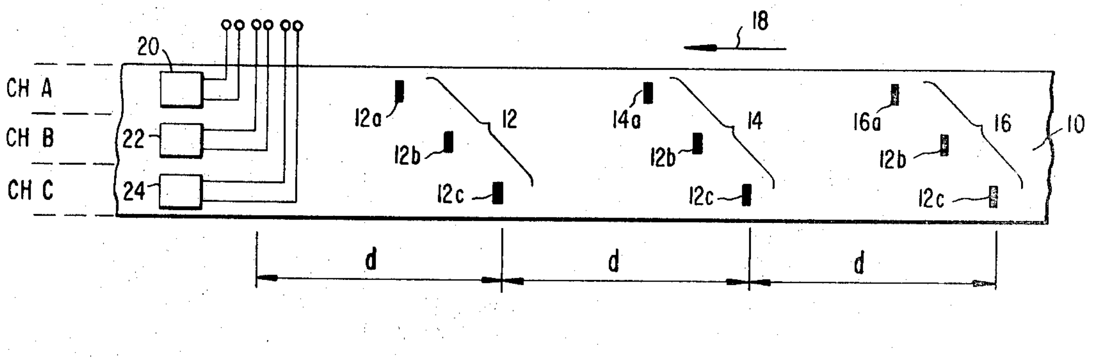
FIG. 1 is a schematic diagram of a three channel magnetic tape carrying skewed three-bit characters.
Figure 4:
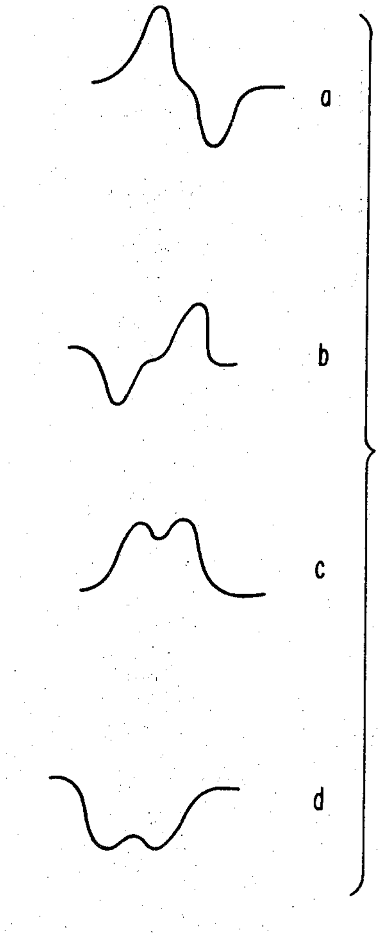
FIG. 4 illustrates the various waveforms sensed by the read head of FIG. 2.

FIG. 1 illustrates a portion of a three channel magnetic tape 10. The channels are identified as *Ch*A, *Ch*B and *Ch*C. Three characters 12, 14, and 16 are recorded on this portion of the tape. Each character consists of three bit position, identified as *a*, *b* and *c*, recorded in corresponding channels A, B and C. The bit period is indicated as the distance *d* between characters. The tape is incrementally driven in the direction indicated by an arrow 18. Each step is approximately the distance *d*. Individual dual-gap read heads 20, 22 and 24 sense the bits in channels A, B and C, respectively.

Figure 2:
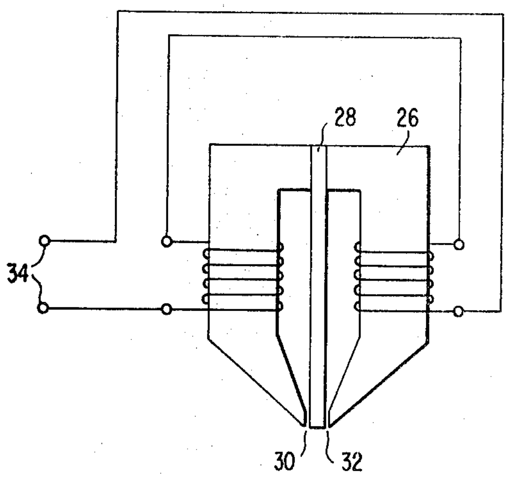
FIG. 2 is a schematic diagram of a duel gap read head use in connection with the deskewing system of the invention.

A preferred type of head used for the channel read heads 20, 22, 24 is illustrated in FIG. 2. It is a $d\phi/dt$ ring type read-write head consisting of a C core 26 and a center space 28 which forms two gaps 30 and 32, each ninety microinches long. Spacer 28 is .001 inch wide. The output winding is wound on both legs of the core and terminates in output terminals 34.

FIG. 3 is a logic diagram of a preferred embodiment of the deskewing system for deskewing the bits of each character recorded on an incrementally driven tape as illustrated in FIG. 1. A complete phase detection circuit is shown only for channel A since the detection circuits are the same for all channels. The detection circuits process either NRZ or NRZI data.

In an incrementally driven or stepped tape system, the amplitude of the read signal produced by the read head is dependent upon tape velocity during the step. Since data with respect to the two gaps 30 and 32 of each read head is completely random, four possible read-back conditions exist for each step: (a) one character is read, (b) two characters are read, (c) one character is read twice, and (d) no data is read. The readout waveform for these four conditions is illustrated in FIGS. 4*a*, 4*b*, 4*c* and 4*d*, respectively.

In condition (a), there is no problem since only one character is read during the step. Condition (b) is unique to the present system in that separation of the characters is performed by a SQUELCH signal as will be described below. SQUELCH performs the function of delaying the detection process until the second character is ready to be accepted. The SQUELCH is also used to degate the detection circuit between steps. Condition (c) can exist when a character is located near the center of the step. Both gaps would be active during this time and would produce two distinct peaked outputs. However, this condition is recognized as only one character by phase detecting the data bit. NRZ or NRZI recording dictates that a positive transmission must follow a negative transmission and vice-versa. After the data bit in a channel is detected, it is set into a skew register. When the register is set, it produces a self-squelching operation which disables the integrating circuits of the channel phase detector.

The operation of the data detecting circuits and the deskewing system will now be described in detail with reference to FIG. 3. Since all the channel detection circuits are identical, we will consider only the channel A circuit. The deskewing system to be described later is common to all three channels. A data signal produced in head 20 is fed to an over-voltage protection circuit 36 which limits the voltage swing applied to the input of a high gain preamplifier 38. Amplifier 38 may consist of two transistors with a maximum gain of 1000. The amplified output from amplifier 38 is fed to a phase splitter 40 in a phase detector circuit 42. Phase splitter 40 has unity gain and consists of one transistor. The positive phase signals are fed to an integrator 44 and the negative phase signals are fed to an integrator 46. Integrators 44 and 46 effectively time sample the pulses appearing at their inputs.

When the outputs of integrators 44 and 46 reach a predetermined level, they set corresponding Schmitt triggers 48 and 50. The setting of a Schmitt trigger indicates that a data bit has been sensed. The data bit signal is passed through an OR circuit 52 to the input of the channel A skew register 54. Schmitt triggers 48 and 50 are cross coupled so that setting of one Schmitt trigger resets the other. As the dual head 20 senses successive data bits (see FIGS. 3*a* and 3*b*), Schmitt triggers 48 and 50 are alternately turned off and reset by the data. However if the dual head should sense the same character twice in one step (see FIG. 3*c*), two successive pulses of the same polarity will be fed to one of the integrators. Assume the first pulse is applied to integrator 44 whose output sets Schmitt trigger 48 to store a bit in skew register 54. If the second pulse is of the same phase, the integrator will again charge to the firing level of the Schmitt trigger, but the Schmitt is already set since it has not been reset by the setting of Schmitt trigger 50. Consequently no output will occur from OR circuit 52 and only a single bit will be recognized.

Once data is stored in the channel A skew register 54, it is desirable to squelch or disable the channel A detection circuit. Consequently, when register 54 is set, a SQUELCH A is applied to a squelch circuit 56 which discharges the capacitors in integrators 44 and 46 and prevents them from being recharged until the trigger in the skew register 54 is reset when the data bits are read out of all the skew registers to a utilization device. The detection circuit is also squelched by external squelch signals SQUELCH M or SQUELCH D which are shown in the timing chart of FIG. 5 and will be explained in more detail below.

Figure 5:
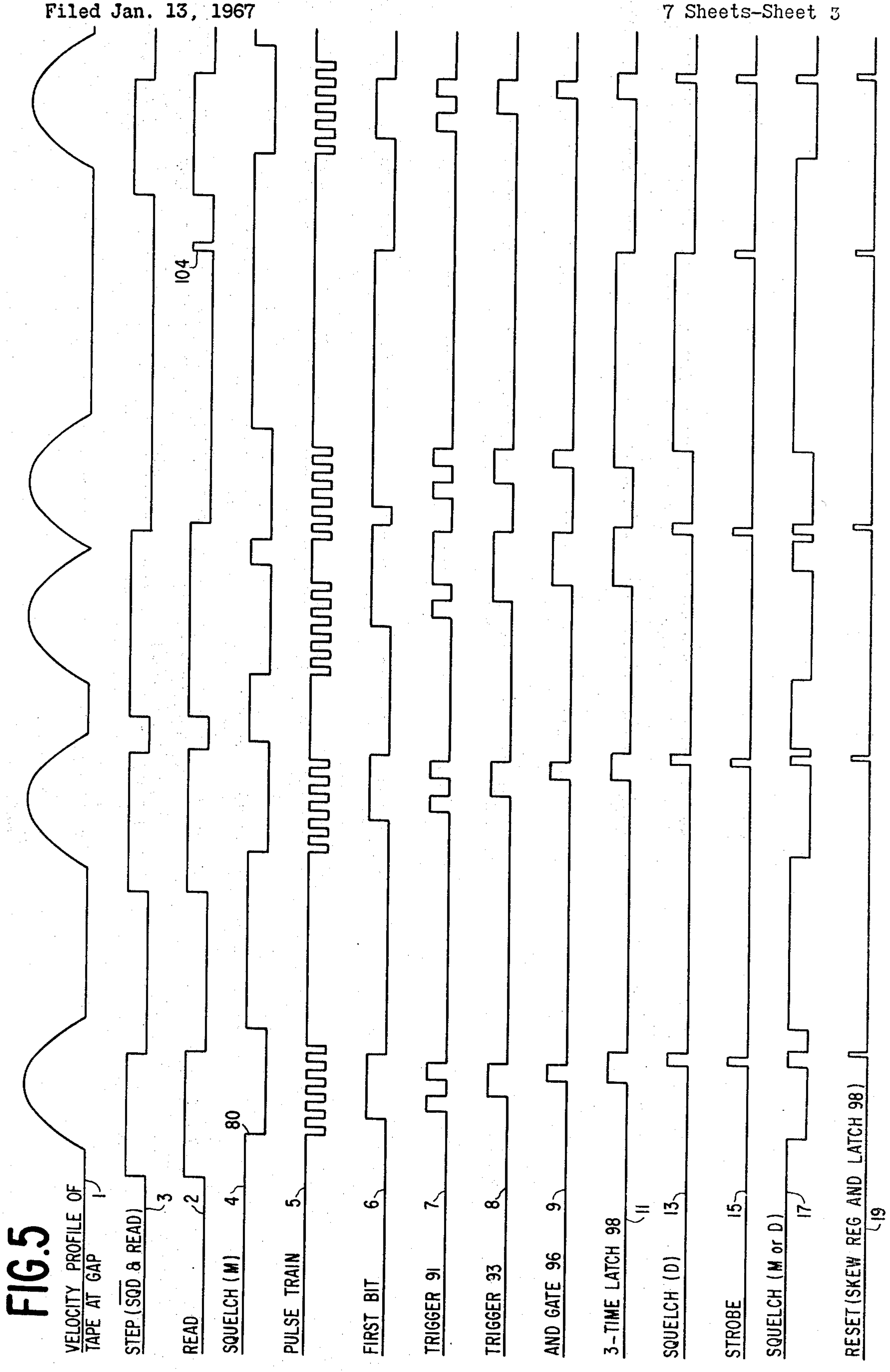
FIG. 5 is a timing chart showing various timing pulses used and generated in the system of FIG. 3.

In the timing chart of FIG. 5, line 1 represents the velocity profile of the tape at the gap of the read head. In order to logically deskew the bits of characters read from an incrementally driven tape, it is necessary to identify the position of the first bit of each character and then to relate the subsequent tape velocity to the distance the tape travels during the incremental step. Line 2 in the timing chart illustrates the READ signal generated by a central processing unit (CPU) to initiate movement of the tape. If a character is not already in the skew registers at the time READ is generated, a STEP signal is generated as shown on line 3. This STEP signal activates the controls of the tape stepping motor (not shown).

Line 4 of the timing chart is identified as SQUELCH M. The SQUELCH M signal is generated by a gated multivibrator or sequential circuit which is described in detail below. Whenever the tape is at rest or has a velocity so low that it will not produce a significant data signal, SQUELCH M is generated to prevent any electrical noise from being sensed as data. During the time of each step when tape velocity is sufficient to produce a detectable data signal, SQUELCH M is dropped to allow tape signals to be processed. The squelch circuits also produce a SQUELCH D signal which is used to separate characters during a reading cycle, i.e. if a complete character is detected during a step, SQUELCH D is generated to prevent the next character from being processed until the first character is read out of the skew registers.

Line 5 is the PULSE TRAIN signal which is initiated at that portion of the tape step when the tape has sufficient velocity to produce a significant data signal, and a data bit is sensed. PULSE TRAIN relates tape velocity at the read head to distance traveled by the tape during the step. The timing of PULSE TRAIN is so related to tape velocity that the positive transitions of the pulses divide each bit period into six approximately equal distances of tape movement.

Figure 6:
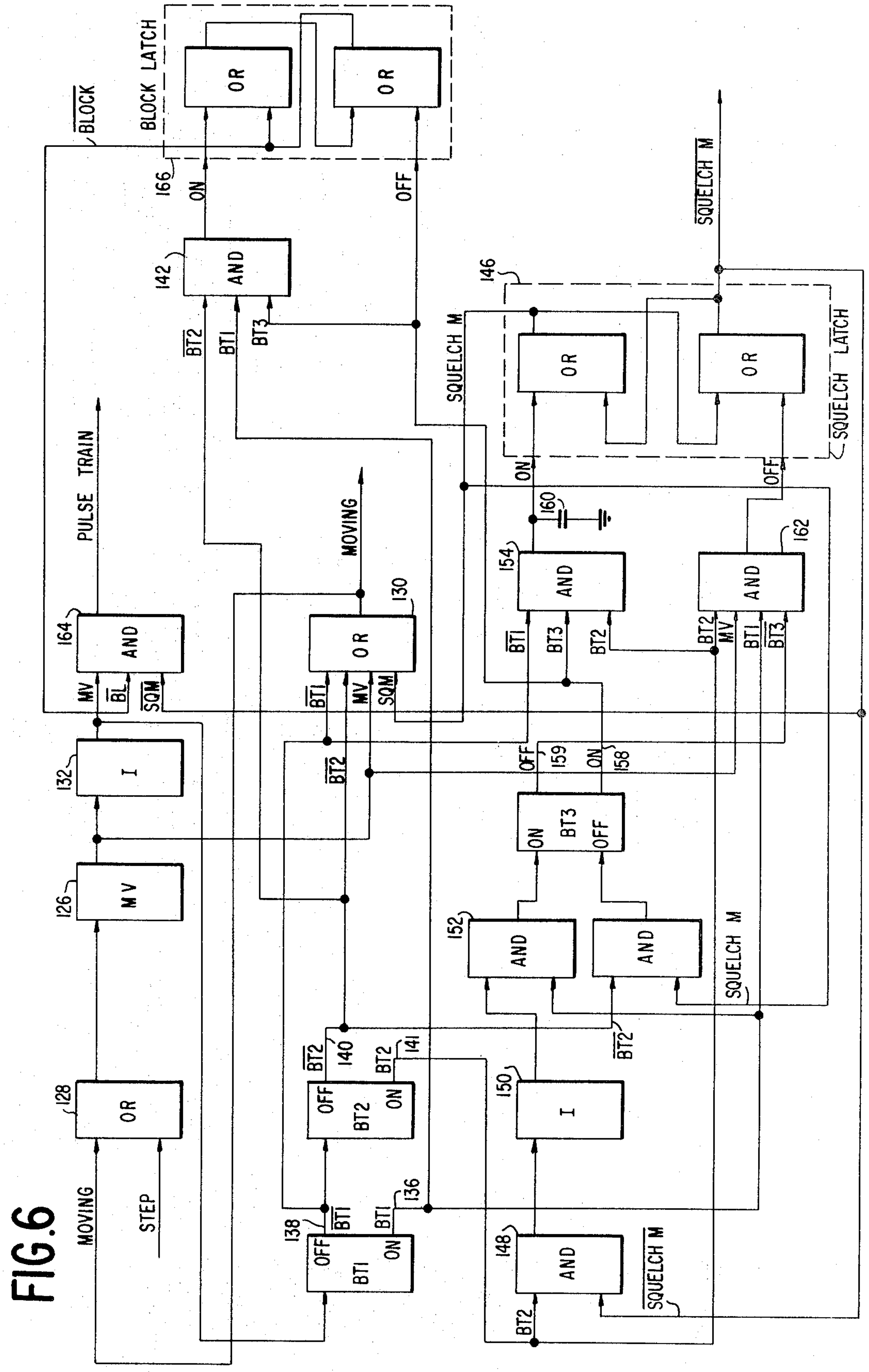
FIG. 6 is a logic block diagram of the multivibrator illustrated in FIG. 3.

In FIG. 3, channel B has a squelch circuit 58 and a skew register 60, and channel C has a squelch circuit 62 and a skew register 64. When the CPU desires data from the tape, it generates a READ signal on line 66 which is connected to one input of an AND circuit 68 and also to one input of another AND circuit 70. If none of the skew registers contains a data bit, there is no SQUELCH D signal on the output of an AND gate 72 and consequently there is a $\overline{\text{SQUELCH D}}$ signal generated by an inverter 74 and applied to the second input of AND gate 68. As seen in line 3 of the timing chart, the output of AND gate 68 is a STEP signal which is fed to the tape drive motor (not shown) and also to the input of a gated multivibrator 76 thereby turning on the PULSE TRAIN output of the multivibrator. The multivibrator 76 is a sequential circuit whose logic is illustrated in FIG. 6. Both the SQUELCH D and the SQUELCH M signals are applied through an OR circuit 78 to the inputs of the individual channel squelch circuits 56, 58 and 62. Consequently, if either of the signals SQUELCH M or SQUELCH D is generated, data is not processed through any of the channel detection circuits.

The SQUELCH M is shown on line 4 of the timing chart. At point 80, the SQUELCH M drops because the tape has reached the minimum velocity necessary to produce a significant data bit signal. Since no data is presently available in the skew registers, the first bit sensed will produce a 1st BIT signal as illustrated on line 6 of the timing chart. Returning to FIG. 1, we see that bit **12*a* is the first one sensed, and therefore the channel A skew register 54 would be set first, thereby producing a data A signal on conductor 82 which is connected to one input of an AND circuit 84. The data A signal corresponds to the 1st BIT signal on line 6 of the timing chart and it is applied to the A input of an OR circuit 86 whose output is connected to one input of a two input AND gate 88**.

The other input to AND gate 88 is the PULSE TRAIN output from multivibrator 76. The PULSE TRAIN consists of six pulses whose positive transitions divide the reading cycle of the deskewing system into six equal portions.

The output of AND gate 88 is applied to the input of a two stage, four-count binary counter 90 containing binary triggers 91 and 93. Counter 90 functions to count four pulses of PULSE TRAIN after the 1st BIT signal is brought up. The four pulses determine the maximum allowable skew in the system. At the end of four pulses, a complete character should be set into the skew registers 54, 60 and 64. After counter 90 has counted three positive transitions of PULSE TRAIN, the in-phase outputs 92 and 94 condition the two inputs of an AND gate 96 whose output turns on a 3-TIME latch 98 whose output conditions the upper input of AND gate 72. The signal on the output of latch 98 is illustrated on line 11 of the timing chart.

On the fourth transition of PULSE TRAIN after 1st BIT is generated, the out-of-phase outputs 100 and 102 of counter 90 condition the other two inputs of AND gate 72 to produce on the output of the gate the SQUELCH D signal, which indicates that a complete character is, or should have been, set in skew registers 54, 60 and 64, and also which squelches the channel detection circuits as previously described. When SQUELCH D appears on the output of AND gate 72, the output of inverter 74 drops so that AND gate 68 is no longer conditioned, thereby preventing the tape from being driven or data from being sensed, even though a READ signal should be generated by the CPU. As seen in the timing diagram, READ is up during PULSE TRAIN and 1st BIT so that all three inputs of AND gate 70 are conditioned to produce a STROBE output which conditions the lower input of AND gates 84, 85 and 87 to gate the character stored in the skew registers 54, 60 and 64 to a register in a tape control unit (not shown). In response to the STROBE, the tape control unit sends a RESET SKEW REGISTER AND LATCH 98 signals which resets the skew registers 54, 60 and 64 and turns off the 3-TIME latch 98. This RESET signal is line 19 of the timing chart. The STROBE signal is line 15. Output 92 of counter 90 is shown in line 7 of the timing chart and output 94 is line 8. The output of AND gate 96 is line 9. Line 17 is the SQUELCH M OR D output of OR circuit 78.

The foregoing discussion has concerned itself with the first tape step appearing in line 1 of the timing chart. Let us now look at the third tape step. Note that 1st BIT in line 6 came up after the third positive transition of PULSE TRAIN so that only three positive transitions are counted by counter 90 before the end of the step. As the end of the step approaches and the tape velocity decreases below the value necessary to produce a significant data signal, SQUELCH M is generated to prevent further reading until the tape again exceeds the minimum velocity in the fourth step. Counter 90 then counts the first positive transition of PULSE TRAIN in the fourth step. In other words, the third SQUELCH D and the third STROBE are not generated until the beginning of the fourth step. However, notice that the first bit of the fourth character is sensed after the second positive transition of PULSE TRAIN so that another complete character is sensed by the read head. Also note that READ was not brought up again after it was dropped when the third character was gated to TCU by the third STROBE. However, after the third STROBE is produced at the beginning of the fourth step, the skew registers are immediately reset so that the fourth character can be stored therein. When the fourth READ signal 104 is generated, the tape is not stepped but a STROBE appears immediately on the output of AND gate 70 to gate the character from the skew registers 54, 60 and 64 through AND gates 84, 85 and 87 to the tape control unit. Looking at AND gate 70, we see that no STROBE is generated after the fourth character is collected so that latch 98 remains on after the third READ signal drops. Since counter 90 was returned to its original state by the four PULSE TRAIN pulses which followed the 1st BIT signal of the fourth character, all three inputs of AND gate 72 remained conditioned so that the SQUELCH D signal remains on one input of AND gate 70. The 1st BIT input of AND gate 70 is also kept up by the output of OR circuit 83. Consequently, when READ signal 104 appears, STROBE is immediately generated to read out the skew registers. Furthermore, the output of inverter 74 is down so that AND gate 68 is not conditioned by the READ signal, thereby preventing a STEP signal from being generated.

Figure 7:
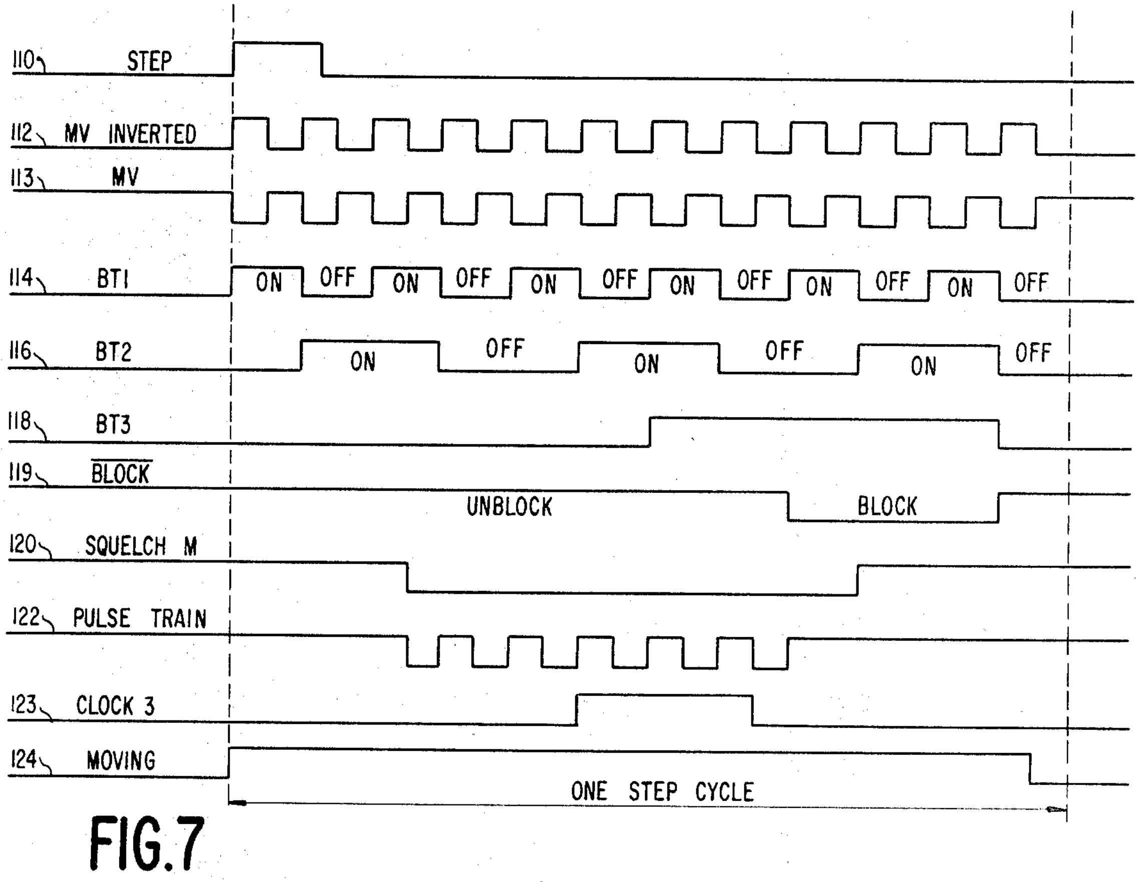
FIG. 7 is a timing chart showing the timing pulses generated by the logic circuit shown in FIG. 6.

SQUELCH M and PULSE TRAIN lines are generated by the gated multivibrator circuit 76. Circuit 76 is actually a sequential circuit whose logic diagram is illustrated in FIG. 6. When a STEP signal on the output of AND circuit 68 energizes the tape stepping motor, a MOVING signal is generated which continuously gates a multivibrator 126 during the tape step. The STEP and MOVING signals are both applied through an OR circuit 128 to the input of multivibrator 126. The multivibrator generates for each step twelve positive transitions as illustrated in line 112 of the timing chart of FIG. 7. The STEP signal appepars on line 110 and the MOVING signal appears on line 124. The output of multivibrator 126 is fed back through an OR circuit 130 and OR circuit 128 to the input of multivibrator 126 to keep pthe multivibrator gated on during the stepping cycle. The timing chart of FIG. 7 illustrates various timing pulses for one tape step. If at the end of one step, the STEP signal still appears on the input of OR circuit 128, the sequential circuit of FIG. 6 will initiate another tape step.

The output of multivibrator 126 is fed through an inverter 132 to the input of binary trigger BT1. When trigger BT1 is on, output 136 is up and output 138 is down. When trigger BT1 is off, output 138 is up and output 136 is down. The signal appearing on output 136 is labeled BT1 and is illustrated in line 114 of the timing chart. The signal appearing on output 138 is 180° out-of-phase with line 114.

Binary trigger BT1 changes state each time the inverted output of multivibrator 126 from inverter 132 has a positive transition. Output 138 of binary trigger BT1 is fed to the input of OR circuit 130 and also to the input of another binary trigger BT2, which changes state each time BT1 goes from the on state to the off state as shown in lines 114 and 116 of the timing chart of FIG. 7. The off output $\overline{\text{BT2}}$ 140 of BT2 is fed to OR circuit 130, an AND circuit 142 and to one input of another AND circuit 144. The other input of AND circuit 144 is SQUELCH M from a squelch latch 146. Consequently, binary trigger BT3 is turned off by the output of AND gate 144 when binary trigger BT2 turns off while SQUELCH M is up. The on output 141 of binary trigger BT2 is fed to the input of an AND circuit 148. The other input of AND circuit 148 is the $\overline{\text{SQUELCH M}}$ or off output of latch 146. The output of AND gate 148 is fed through an inverter 150 to the input of another AND circuit 152. The other input of AND circuit 152 is from the on output 136 of binary trigger BT1. Consequently, binary trigger BT3 is turned on when binary trigger BT1 turns on while binary trigger BT2 is on and SQUELCH M is down (squelch latch 146 is off).

Squelch latch 146 is turned on by the coincidence of $\overline{\text{BT1}}$ and BT2 and BT3. This action is caused by the output of an AND gate 154 connected to the on input of the squelch latch. One input of AND gate 154 is conditioned by the off or $\overline{\text{BT1}}$ output 138 of binary trigger BT1. Another input of AND gate 154 is connected to the on or BT3 output 158 of trigger BT3. The third input of AND gate 154 is connected to the on or BT2 output 141 of binary trigger BT2.

A capacitor 160 is connected between the output of AND circuit 154 and ground to impart a delay between the output of AND circuit 154 and the input of the squelch latch 146. This delay is for the purpose of allowing binary trigger BT2 to completely turn off or settle down at the end of the seventh output pulse of binary trigger BT1 (see line 114 of the timing chart in FIG. 7). Without the capacitor 160, it is possible that the three inputs of AND gate 154 would be conditioned between the seventh and eighth BT1 pulses and turn on SQUELCH at the wrong time.

The squelch latch 146 is turned off when all four inputs of an AND circuit 162 are conditioned. Looking at the timing chart, we see that SQUELCH M is generated by a positive transition of a multivibrator pulse plus an ON condition of binary triggers BT1, BT2 and an OFF condition of BTE. The upper input of AND gate 162 is connected to the on output 141 of BT2, the next input is connected to the output of multivibrator 126, the next input is connected to the on output 136 of BT1, and the last input is connected to the off output 159 of binary trigger BT3.

The inverted output of multivibrator 126 is passed through an AND circuit 164 as the PULSE TRAIN signal when a block latch 166 is off and when SQUELCH M is off. One input of AND circuit 164 is connected to the output of inverter 132, another input is connected to the off or $\overline{\text{BLOCK}}$ output of latch 166 and the third input is connected to the off or $\overline{\text{SQUELCH M}}$ output of latch 146. The block latch functions to turn off PULSE TRAIN near the end of the tape step when the tape velocity has fallen below the minimum level required to produce a significant READ signal. This result is accomplished by anding together at the input of AND gate 142, the off or $\overline{\text{BT2}}$ output 140 of binary trigger BT2, the on or BT1 output 136 of binary trigger BT1 and the on or BT3 output 158 of binary trigger BT3. Lines 114, 116, 118 and 119 of the timing chart in FIG. 7 reflect this AND function.

FIG. 8 is a timing chart illustrating a modification of the STROBE generating logic illustrated in FIG. 3. Because of the variations of velocity of the tape during a step, the distance traveled by the tape during four positive transitions of PULSE TRAIN depends upon when in a step the first bit of a character is sensed. The velocity profile 170 is shown for a tape incrementally driven in steps of .005 inch at the rate of 150 steps per second. A CLOCK-3 LATCH line is generated by the inverted output of multivibrator 126 as illustrated in line 112 of FIG. 7. It is turned off after the next positive transition of line 112 as will be described in detail below.

The velocity profile 170 is divided into seven areas, $d_0$, $d_1$ . . . $d_5$, $d_6$, which represent the distances the tape travels when the velocity squelch, SQUELCH M, is off. The six positive transistors of PULSE TRAIN define five distances $d_1$ . . . $d_5$ available to a reading cycle depending upon when 1st BIT is generated. The areas are labeled with the percentage of the total tape distance $d$ of one step. The distance the tape travels between the time 1st BIT occurs and STROBE is generated may be defined as the character gate distance. It is desirable to obtain a nominal character gate distance of fifty percent of the total tape distance $d$.

In this modification, the sequential circuit of FIG. 6 is modified so that STROBE may ben generated at the end of either three or four positive transitions of PULSE TRAIN. The percentage figures shown in FIG. 8 on either side of all the positive transitions of PULSE TRAIN represent the perecentage of the distance $d$ the tape will travel before STROBE occurs if 1st BIT occurs just before or after each respective positive transition. For example, if 1st BIT occurs immediately before the first positive transition of PULSE TRAIN, the tape will move 37.4% ($d_1+d_2$) of the total step distance $d$ before STROBE is generated. The percentages representative of the cases in which 1st BIT occurs just before positive transition are minimum figures since, if 1st BIT occurs sooner, the distance the tape travels before STROBE is generated will be greater. Similarly, the percentages representative of the cases in which 1st BIT occurs just after a positive transition are maximum, since if a 1st BIT occurs later, the distance the tape travels before STROBE is generated will be less. From FIG. 8, it can be seen that the maximum distance the tape can travel during four positive transitions of PULSE TRAIN is 64.9% of the total distance $d$ and the minimum distance it can travel is 35.1% of distance $d$. In other words, the character gate distance equals $(.50\pm.149)\ d$.

The CLOCK-3 LATCH line is brought up by the third positive transition of MV inverted illustrated in line 112 of FIG. 7. If 1st BIT is brought up earlier enough in the step so that three positive transitions of PULSE TRAIN are counted while CLOCK-3 LATCH is up, then STROBE is generated by the third positive transition. The character gate distance of $.35d$ to $.65d$ was found to be desirable. If the character gate is less, a complete character may not be read. If the character gate is longer, the bits of a second character may be sensed at the end of the step. This latter situation may cause an ambiguity when two successive single bit characters follow one another in different channels and the single bit is in the lagging bit position in the first character and is the leading bit in the second character.

A logic circuit for generating STROBE after three positive transitions of PULSE TRAIN when 1st BIT occurs early in the step is illustrated in FIG. 9. The circuit also generates STROBE after four transitions when 1st BIT occurs at other times. The same reference numerals have been used to indicate corresponding elements in FIGS. 3 and 9. As already explained in connection with FIG. 3, for the generation of STROBE after four transitions of PULSE TRAIN, when the first bit of character is sensed, PULSE TRAIN is gated through AND circuit 88 to drive the two stage binary counter 90 comprising a binary trigger 91 and a binary trigger 93. When the third positive transition of PULSE TRAIN is counted, both inputs of AND circuit 96 are conditioned to turn on the 3-TIME latch 98. The on condition of latch 98 conditions an AND circuit 72 so that when counter 98 is returned to its original position at the fourth positive transition, an output pulse from AND circuit 72 is passed through an OR circuit 172 to produce SQUELCH D which contains the lower input of AND circuit 70 to generate STROBE at the end of four positive transitions of PULSE TRAIN.

However, in this modification, the on condition of 3-TIME latch 98 also conditions one of the inputs of an AND circuit 174. The other input is conditioned by the CLOCK-3 line illustrated in the timing diagram of FIG. 10. CLOCK-3 is generated at the third positive transition of the inverted multivibrator output (line 112 of FIG. 7). The positive transition of the inverted multivibrator output, the off condition of binary trigger BT1, the on condition of binary trigger BT2 and the off condition of the SQUELCH M latch 146 condition a four input AND gate 176 to turn on a CLOCK-3 latch 178, thereby generating a CLOCK-3 line. Latch 178 is turned off and CLOCK-3 thereby drops at the negative transition between the seventh and eighth transitions of the multivibrator output. This turn-off is accomplished by conditioning the inputs of a three input AND gate 180 with the negative transition of the multivibrator output, the off condition of the binary trigger BT1 and the off condition of binary trigger BT2. The output of the AND gate 180 when turns off latch 178 to drop CLOCK-3.

The timing chart of FIG. 10 illustrates two tape steps. In the first step, the first bit is sensed just before the fourth positive transition of PULSE TRAIN and consequently counter 90 will not count three positive transitions while CLOCK-3 is up. Therefore, the character is completed by generating a STROBE on the first positive transition of the next PULSE TRAIN. However, the first bit of the next character occurs just after the second positive transition of PULSE TRAIN and consequently the 3-TIME latch 98 will be turned on three positive transitions of PULSE TRAIN later while CLOCK-3 is up. Consequently, STROBE will be generated at the end of only three positive transitions after the occurrence of the bit. Note that the tape distance traveled during the second reading cycle is 59% of the total tape step even though only three positive transitions of PULSE TRAIN were counted, whereas only 44% of the tape step was covered during the four transition counted for reading the first character.

In another embodiment of the invention, the tape is stepped twice during each bit period *d*. Again the dual gap head of FIG. 2 is used. The basic circuit is the same as that illustrated in FIG. 3 with the exception that the sequential circuit contains an asymmetrical multivibrator which will be described in detail below. It functions to divide each tape step into three periods T1, T2, and T3. T1 and T3 are equal in time and occur at the beginning and end of each step respectively. T2 is shorter than T1 and T3 and occurs during the maximum velocity portion of the tape step. In a practical embodiment, T1 and T3 are twice as long as T2.

The timing chart in FIG. 11 illustrates the waveforms necessary to understand the operation of this double step embodiment. Line 182 illustrates a three channel magnetic tape carrying three characters whose bits appear skewed in the three channels. Line 184 shows the velocity profile of the tape when it is stepped twice during each bit period *d*. Line 186 is the READ signal generated by the CPU. Line 188 is the STEP signal which is sent to the tape drive motor if the SQUELCH D signal is not present. Line 186 is the FIRST BIT signal. Line 192 is the output of the asymmetrical multivibrator 182 illustrated in FIG. 12. Line 194 is the PULSE TRAIN gated out of the multivibrator after the first bit is sensed. Line 196 is the SQUELCH D or character available signal. Line 198 is the STROBE signal.

The multivibrator output MV effectively divides the bit period into six equal bit distances, each equal to 16⅔% of the bit distance. By counting four MV pulses after the first bit in the character is sensed, we are assured that at least 50% (3×16⅔%) of a bit period is read after the first bit is sensed. If it is assumed that the gap separation of the dual gap head is 25% of the bit distance *d*, then the worst case of skew which the system can handle is *.25d*, i.e. the distance between the first bit of the character and any other bit of the character does not exceed *.25d*.

Looking at the timing chart in FIG. 11, we see that the first pulse of MV is initiated by the beginning of the STEP line 184. The fourth pulse of PULSE TRAIN in line 189 after FIRST BIT occurs just before the middle of the second step. On the fourth count of PULSE TRAIN the counter 90 in FIG. 3 causes SQUELCH D to be generated indicating that a character is contained in the skew registers. The STROBE signal is generated to read out the registers, drop the FIRST BIT line and reset the registers as described in connection with FIG. 3.

The logic diagram for generating MV and PULSE TRAIN of FIG. 11 is shown in FIG. 12 and will be described in connection with the timing chart in FIG. 13. If the CPU sends a READ signal and data is not available in the skew register to that $\overline{\text{SQUELCHD}}$ is up, an output will be generated by an AND gate 200. This output is applied to one input of a three input AND gate 202. The other two inputs of AND gate 202 are lines *b* and *d* of the timing chart in FIG. 13. When all three inputs of AND gate 202 are up, the output of AND gate 202 on conductor 204 drops to trigger ON a single shot multivibrator SS1 which has a timing period $3T_1/2$. The multivibrator also includes a single shot SS2 which has a timing period $T_1$ and another single shot SS3 which has a timing period $3T_1/2$. All three single shots are normally OFF whereby their OFF output terminals are at a low logic level and their ON output terminals are at a high logic level. When a single shot is triggered into its unstable state or timing period, it is considered to be ON, whereby its ON terminal is at a low logic level and its OFF terminal is at a high logic level. These levels are clearly reflected in the timing chart of FIG. 13.

Consequently, assuming that all three single shots are OFF, a READ signal will cause the output of AND circuit 202 to drop and trigger ON single shot SS1. However, the output *a* almost immediately returns to the high level since the ON output of single shot SS1 drops to destroy the AND function at the input of AND circuit 202. The output of AND circuit 202 is therefore a very narrow negative pulse as illustrated in line *a* of the timing chart. The OFF output of SS1 produces the step signal which is fed to the tape drive motor controls. The step signal is 180° out of phase with the signal illustrated in line *b* of the timing chart. Line *b* is produced on the output of an inverter 206 connected to off output of SS1. The negative transition of line *b* triggers a pulse generator 208 which produces the MV pulse P1 (FIG. 11). Line *a* on the output of AND circuit 202 also triggers ON the single shot SS2 whose off terminal is connected to an inverter 210 whose output is line *c*. The positive transitions of line *c* are fed to pulse generator 208 to produce the MV pulse P2. The ON output terminal of single shot SS2 is fed to an inverter 212 whose output is 180° out of phase with line *c*. The positive transitions of the signal appearing on the output of inverter 212 are fed to pulse generator 208 to produce the MV pulse P3. It may also be considered that the negative transitions of line *c* are used to produce this pulse P3. Single shot SS3 is turned on every time single shot SS3 times out, i.e., returns from its on to its off state. Consequently, even though single shot SS1 times out at $3T_1/2$, single shot SS3 has been turned ON at the end of time $T_1$ so that the AND function at the input of AND circuit 202 is not met until the full step period of $T_1+T_2+T_3$ is completed. At the end of that time if READ is still up, another set of pulses P1, P2, P3 is generated.

Pulse generator 208 consists of three gated single shots SS4, SS5 and SS6 which have very short timing periods as indicated by the width of the pulses illustrated in line *e* of FIG. 13. Single shot SS4 is gated on by positive transitions of line *b*, single shot SS5 by the positive transitions of line *c*, and single shot SS6 by the negative transitions of line *c*. The outputs of the three single shots are applied to the three inputs of a 4-input end gate 214 and are passed as PULSE TRAIN when FIRST BIT is applied to the fourth input of the gate.

While the invention has been particularly shown and described with reference to a preferred embodiment thereof, it will be understood by those skilled in the art that various changes in form and details may be made therein without departing from the spirit and scope of the invention.

What is claimed is:

1. A deskewing system for reading a group of data bits recorded on plural channels of a record moved in steps relative to bit sensing means, each group forming a character, said system comprising:

(a) means for generating clock pulses during each step, (b) means responsive to the first data bit sensed in a group for detecting said clock pulses, (c) means for sensing data bits only during a reading cycle defined by a predetermined number of detected pulses, and (d) squelch circuit means coupled to said sensing means and operable by a squelch signal to disable said sensing means.

2. A deskewing system as defined in claim 1 further comprising means for producing a first squelch signal to operate said squelch circuit means and disable said sensing means when the velocity of the tape is below a predetermined minimum velocity.

3. A deskewing system as defined in claim 2 wherein said tape is stepped once during each bit period, said generating means generates a fixed number of clock pulses during each step, and said detecting means comprises counting means for counting said predetermined number of detected pulses, said system further comprising means for producing a second squelch signal to operate said squelch circuit means to disable said sensing means when said predetermined number of detected pulses have been counted.

4. A deskewing system as defined in claim 3 further comprising:

(a) a bit storage device associated with each tape channel and coupled to said sensing means, (b) means for transferring said data bits from said sensing means to the bit storage devices while said predetermined number of pulses are being counted, and (c) means for simultaneously gating all of said bits from said storage devices to a utilization device when said predetermined number of pulses have been counted.

5. A deskewing system as defined in claim 4 wherein said bit sensing means comprises a plurality of individual bit sensing devices, one for each of said channels; and said squelch circuit means comprises a plurality of individual squelch circuits, each coupled to a corresponding one of said bit sensing devices and operable by a third squelch signal to disable its corresponding bit sensing device; and means responsive to the transfer of a data bit to each bit storage device to produce a third squelch signal to operate the squelch circuit coupled to the bit sensing device associated with said each bit storage device.

6. A deskewing system as defined in claim 4 further comprising means for initiating a second tape step if said predetermined number of pulses are not counted during the preceding step and all the bits of a first character are not sensed during said preceding step, whereby the remaining bits of said first character are sensed during said second step, and all of the bits of said first character are simultaneously transferred to said utilization device by said gating means.

7. A deskewing system as defined in claim 6 wherein all the bits of a second character are also sensed during said second step, and comprising means for transferring the bits of a second character sensed during said second step to said storage devices after the complete first character has been gated to said utilization device.

References Cited

UNITED STATES PATENTS

| | | | |
|---|---|---|---|
| 2,991,452 | 7/1961 | Welsh | 340—174.1 |
| 3,172,091 | 3/1965 | Friend | 340—174.1 |
| 3,275,208 | 9/1966 | Poomakis | 340—174.1 |
| 3,287,714 | 11/1966 | Dustin | 340—174.1 |
| 3,332,084 | 7/1967 | Wahrer et al. | 340—174.1 |

BERNARD KONICK, Primary Examiner

W. F. WHITE, Assistant Examiner

U.S. Cl. X.R.

235—61.11

UNITED STATES PATENT OFFICE

CERTIFICATE OF CORRECTION

Patent No. 3,544,979 Dated December 1, 1970

Inventor(s) Earl G. McDonald, Jr., et al

It is certified that error appears in the above-identified patent and that said Letters Patent are hereby corrected as shown below:

Column 2, line 24 - "use" should be "used"

line 53 - "position" should be "positions"

line 63 - "space" should be "spacer"

Column 5, line 19 - "positive" should be inserted after "fourth"

Column 7, line 15 - "BTE" should be "BT3"

line 53 - "transistors" should be "transitic

Column 8, line 46 - "contains" should be "conditions"

Column 9, line 6 - "the bit" should be "the first bit line 65 - "to that" should be "so that"

line 65 - No space between Squelch and D

Column 10, line 34 - "SS3" should be "SS2"

Signed and sealed this 13th day of April 1971.

(SEAL)
Attest:

EDWARD M.FLETCHER,JR.
Attesting Officer

WILLIAM E. SCHUYLER,
Commissioner of Pate